(12) United States Patent
Miyajima

(10) Patent No.: US 7,519,061 B2
(45) Date of Patent: Apr. 14, 2009

(54) INTERNET TELEPHONE AND COMMUNICATING METHOD

(75) Inventor: Akira Miyajima, Kanagawa (JP)

(73) Assignee: Panasonic Corporation, Osaka (JP)

( * ) Notice: Subject to any disclaimer, the term of this patent is extended or adjusted under 35 U.S.C. 154(b) by 866 days.

(21) Appl. No.: 10/763,204

(22) Filed: Jan. 26, 2004

(65) Prior Publication Data

US 2004/0190518 A1 Sep. 30, 2004

(30) Foreign Application Priority Data

Mar. 27, 2003 (JP) .............................. 2003-088584

(51) Int. Cl.
*H04L 12/28* (2006.01)
(52) U.S. Cl. .................... 370/392; 370/352; 370/356
(58) Field of Classification Search .................. None
See application file for complete search history.

(56) References Cited

U.S. PATENT DOCUMENTS 5,742,596 A * 4/1998 Baratz et al. ................ 370/356
6,243,720 B1 * 6/2001 Munter et al. ............... 707/206
2001/0026545 A1 * 10/2001 Matsumoto et al. ......... 370/338

FOREIGN PATENT DOCUMENTS

JP 2-101198 4/2002

OTHER PUBLICATIONS

English Language Abstract of JP 2002-101198.

* cited by examiner

*Primary Examiner*—Duc C Ho
(74) *Attorney, Agent, or Firm*—Greenblum & Bernstein, P.L.C.

(57) ABSTRACT

A network address of a network to which an Internet telephone is connected is registered in a RAM. When an operator inputs an extension number of a destination terminal (an Internet telephone) that is connected to the same network, a CPU combines the registered network address in the RAM and the input extension number in order to generate an IP address. Based on this IP address, a call is placed to the destination terminal (the Internet telephone) of the extension number.

11 Claims, 8 Drawing Sheets

INTERNET TELEPHONE AND COMMUNICATING METHOD

BACKGROUND OF THE INVENTION

1. Field of the Invention

The present invention relates to an Internet telephone and a communicating method that realize a telephone call via the Internet.

2. Description of Related Art

A conventional network that is used by so-called Internet telephone has been configured as follows.

Taking an IP telephone system using H.323 protocol as an example, a managing server (referred to as gatekeeper) is provided within an Internet telephone network. This gatekeeper has functions to receive a phone number of a destination to be called, from each telephone in a unified way, to convert the phone number into a corresponding IP address, and to return the phone number back to the called telephone.

When an operator inputs the desired phone number to be called, the number is called. When the telephone receives the IP address that corresponds to the telephone number from the gatekeeper, the telephone can access, based on the IP address, to a telephone of the desired destination to be connected via the gatekeeper, or directly access the telephone without involving the gatekeeper. Accordingly, the telephone call can be made available via the Internet (see Prior Art 1).

In addition, a router is normally involved between a gatekeeper and each telephone. A plurality of Internet telephones are connected to such a router, configuring a group in a network. Telephones within the same group have IP addresses having a common network address. In a normal corporate office setting, telephones within the same department are configured as the same group on the network.

[Related Art 1]

Japanese Patent Laid Open Publication 2002-101198 (Pages 4-5, FIG. 1)

The above described conventional art has the following problems.

Since a network used by Internet telephones require a managing server, arrangements have to be made to install such managing servers to use the Internet telephones, thereby making it complicated and expensive to configure such a network.

SUMMARY OF THE INVENTION

The present invention is provide to address the above-described problems. The purpose of the invention is to provide an Internet telephone and an Internet telephone system that realize a telephone conversation via the Internet.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, in reference to the above-described drawings.

Figure 1:
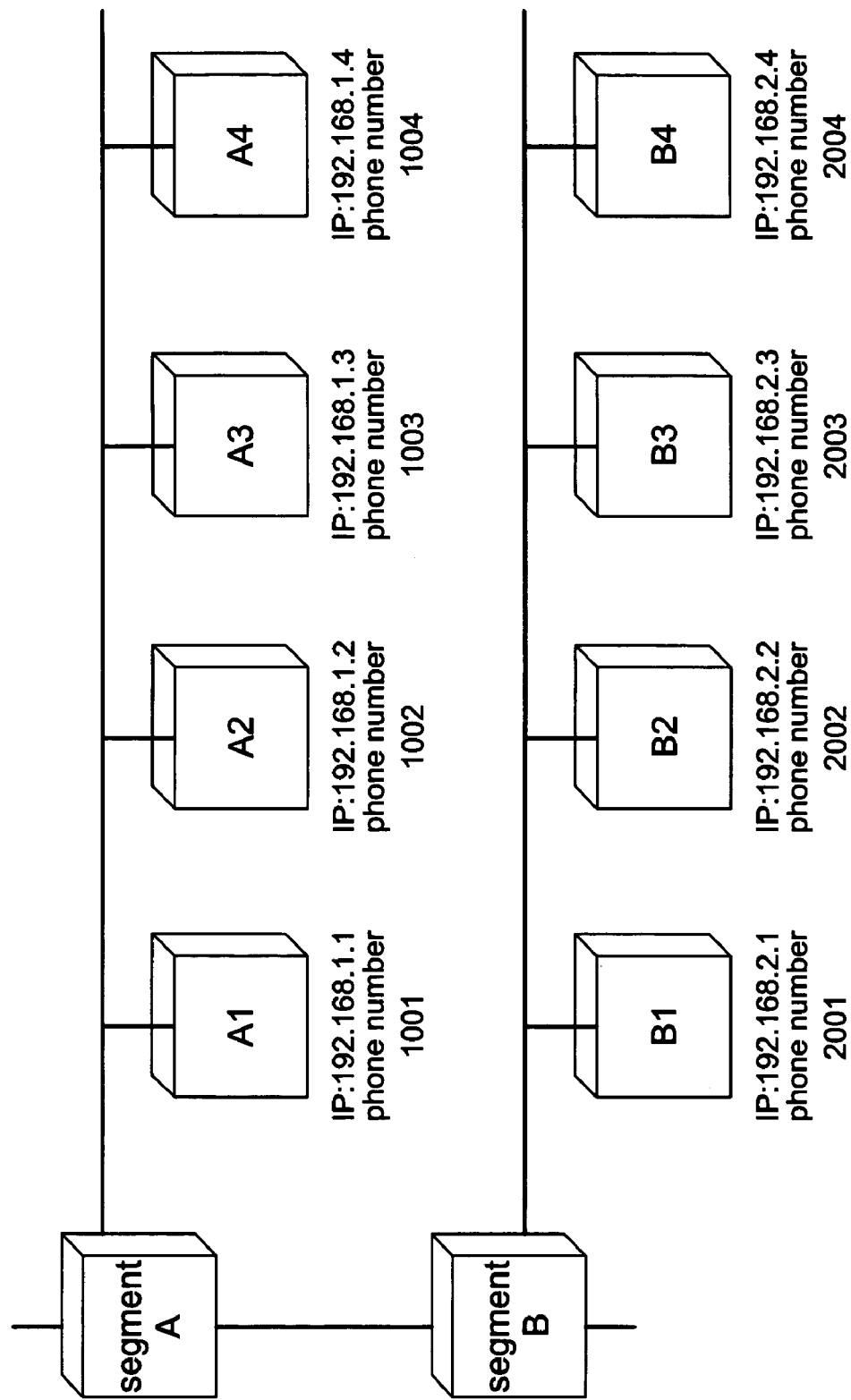
FIG. 1 illustrates a configuration of a network that connects Internet telephones according to an embodiment of the present invention.

FIG. 1 illustrates a configuration of a network that connects Internet telephones according to an embodiment of the present invention.

In the network shown in FIG. 1, Internet telephones A1-A4 are connected to segment A (configuring group A), while Internet telephones B1-B4 are connected to segment B (configuring group B).

In this embodiment, a telephone number (extension number) assigned to each Internet telephone, on the network, corresponds to each IP address. To be specific, a telephone number includes a segment number in the first digit, and a number assigned to each terminal (hereafter referred to as "terminal number") in the second to fourth digits. Further, an IP address includes a common network address in the first and second octets (192. 168. *. *), the segment number in the third octet, and the terminal number in the fourth octet. In this example, "1" is used for segment A and "2" is used for segment B, as segment numbers for the IP address.

In the above illustration of this embodiment, a private address (192. 168. *.*) is used as a network address. However, a global address can be applied as a network address in a similar method.

The following illustration uses Internet telephone A1, which is connected to segment A. A telephone number (extension number) 1001 is assigned to Internet telephone A1. This number is a combination of segment number "1" and terminal number "001". In addition, (192. 168. 1. 1) is assigned as an IP address of the telephone. This IP address includes segment number "1" in the third octet, and terminal number "1" in the fourth octet.

Other Internet telephones A2-A4 within segment A respectively have assigned phone numbers 1002-1004 and IP addresses (192. 168. 1. 2)-(192. 168. 1. 4). Similarly, Internet telephones B1-B4 within segment B respectively have assigned phone numbers 2001-2004 and IP addresses (192. 168. 2. 1)-(192. 168. 2. 4).

Further, in the network to which the Internet telephones of the present embodiment are connected, "000" are applied to the last three digits for the group telephone numbers. In particular, "1000" is used as the group telephone number for group (A), while "2000" is used as the group telephone number for group (B). When a group telephone number is specified, the calling process is performed until one of the terminals within the group is connected.

In addition, each group within the network of FIG. 1 can be considered as a department of a corporation. The exemplary setting of the Internet telephones at a department is illustrated in the figure.

Although FIG. 1 illustrates a situation where Internet telephones are connected to a network, the configuration can be made so that each ordinary telephone (without the Internet telephone functions) is connected to a control apparatus facilitating the Internet telephone functions (hereafter referred to as "control adaptor"). In the following illustrations, ordinary telephones are connected to such a control adaptor in order to function as Internet telephones.

Figure 2:
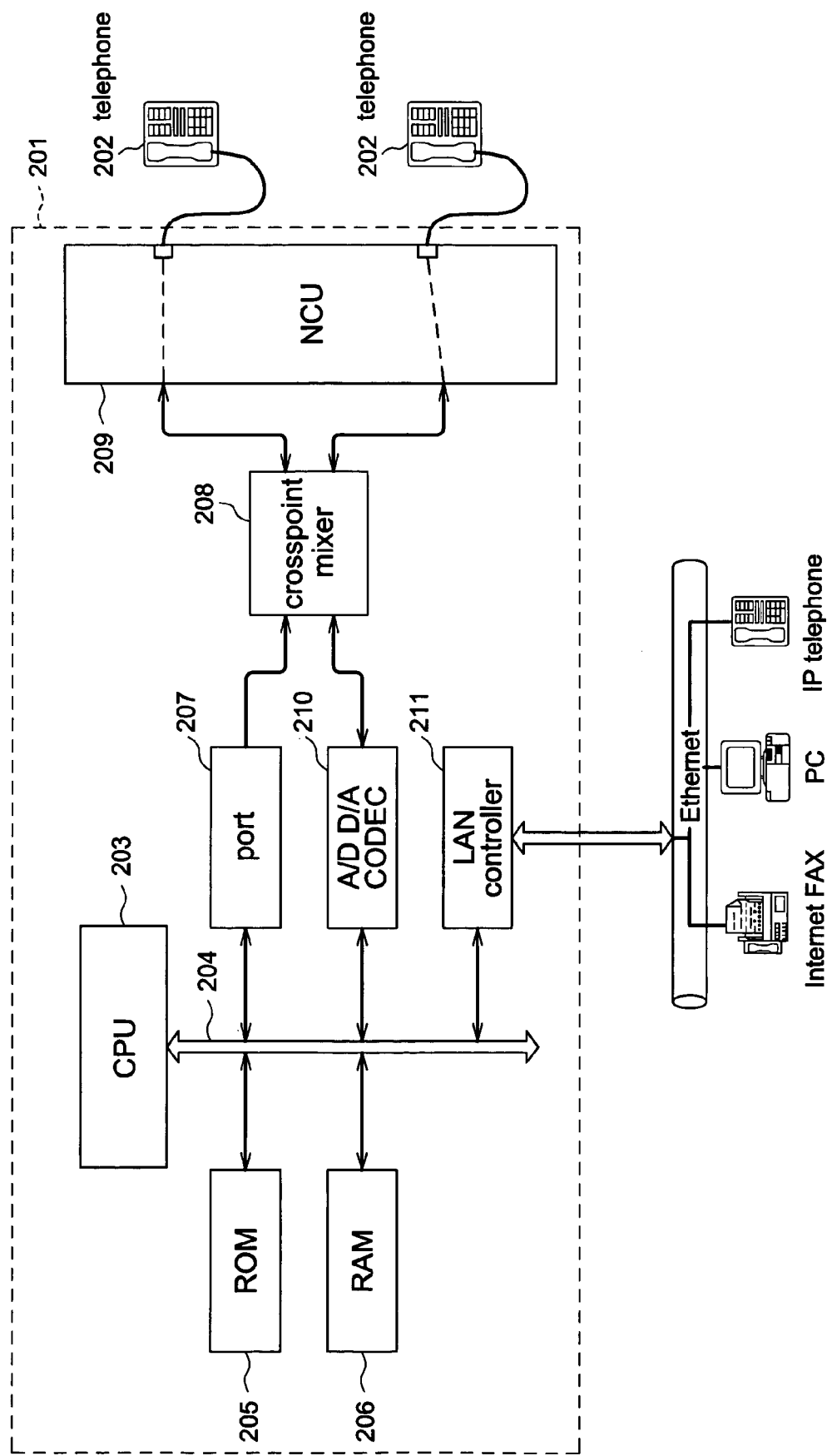
FIG. 2 is a block diagram illustrating a configuration of the Internet telephone according to the embodiment of the present invention.

FIG. 2 is a block diagram illustrating the configuration of the Internet telephones according to the present embodiment of the invention.

As shown in FIG. 2, the Internet telephone according to the present embodiment is configured to connect ordinary telephone 202 with control adaptor 201. Control adaptor 201 according to the present embodiment can connect up to two telephones 202 in order to facilitate each telephone to function as an Internet telephone. Certainly, a configuration can also be made where more than three telephones can be connected to control adaptor 201.

Control adaptor 201 is provided with CPU 203 that controls the entire control adaptor 201. ROM 205 and RAM 206 are connected to CPU 203 via control bus 204. ROM 205 stores a control program for control adaptor 201, the program being retrieved and executed by CPU 203. RAM 206 functions as a work memory when CPU 203 executes the control program. In control adaptor 201, a flash ROM is used as ROM 205, while an SDRAM is used as RAM 206.

Especially, a predetermined region of RAM 206 is assigned to register information such as a counter for counting the number of machines, and ranges that specify starting and ending addresses for the call (range starting/ending address). RAM 206 also registers a network address portion (and/or numeric strings corresponding to the network address portion) of an IP address assigned to the Internet telephones.

Crosspoint mixer 208 is also connected to CPU 203 via port 207. Crosspoint mixer 208 has switching and mixing functions of talk lines for the two telephones connected via an NCU (Network Control Unit), which is later described.

NCU 209 is connected to crosspoint mixer 208. NCU 209 controls telephone lines connected to control adaptor 201, and connects/cuts a line to an opposing side.

Further, A/D D/A CODEC 210 and LAN controller 211 are connected to CPU 203 via control bus 204. A/D D/A CODEC 210 performs an analog/digital conversion of voice data, which is input from telephone 202, and conducts a compression process. A/D D/A CODEC 210 also receives the compressed data via LAN controller 211 to restore the data, and performs the analog/digital conversion.

LAN controller 211 controls signals exchanged with the Ethernet, the Ethernet configuring the network to which control adaptor 201 is connected. LAN controller 211 also assembles and analyses packet data transmitted on the network.

When an Internet telephones are used for the above configuration, instead of connecting an ordinary telephone to control adaptor 201, a control board having the function of control adaptor 201 is installed to the Internet telephones.

The Internet telephone having the above configuration uses the relationship of a telephone number and an IP address of the Internet telephone (which is connected to the above described network). Unlike the conventional Internet telephone system, the Internet telephone of the present invention places a direct call to an Internet telephone of the destination without involving a managing server.

The following illustrates an operation of one Internet telephone, according to the present embodiment having the above configuration, that calls another Internet telephone on the network.

Figure 3:
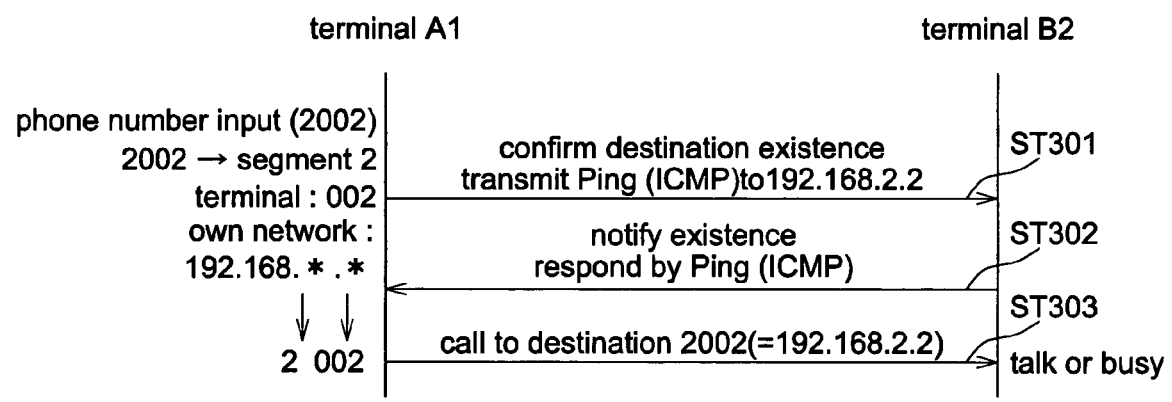
FIG. 3 is a sequence chart illustrating an operation of the Internet telephone according to the embodiment of the present invention.
Figure 4:
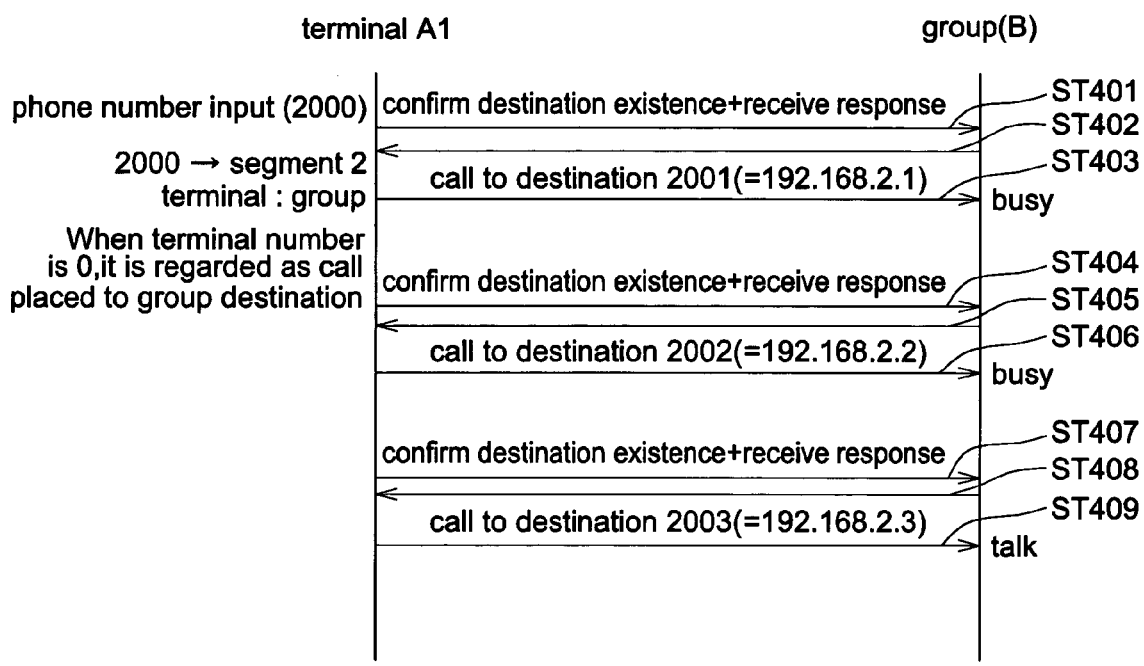
FIG. 4 is a sequence chart illustrating an operation of the Internet telephone according to the embodiment of the present invention.
Figure 5:
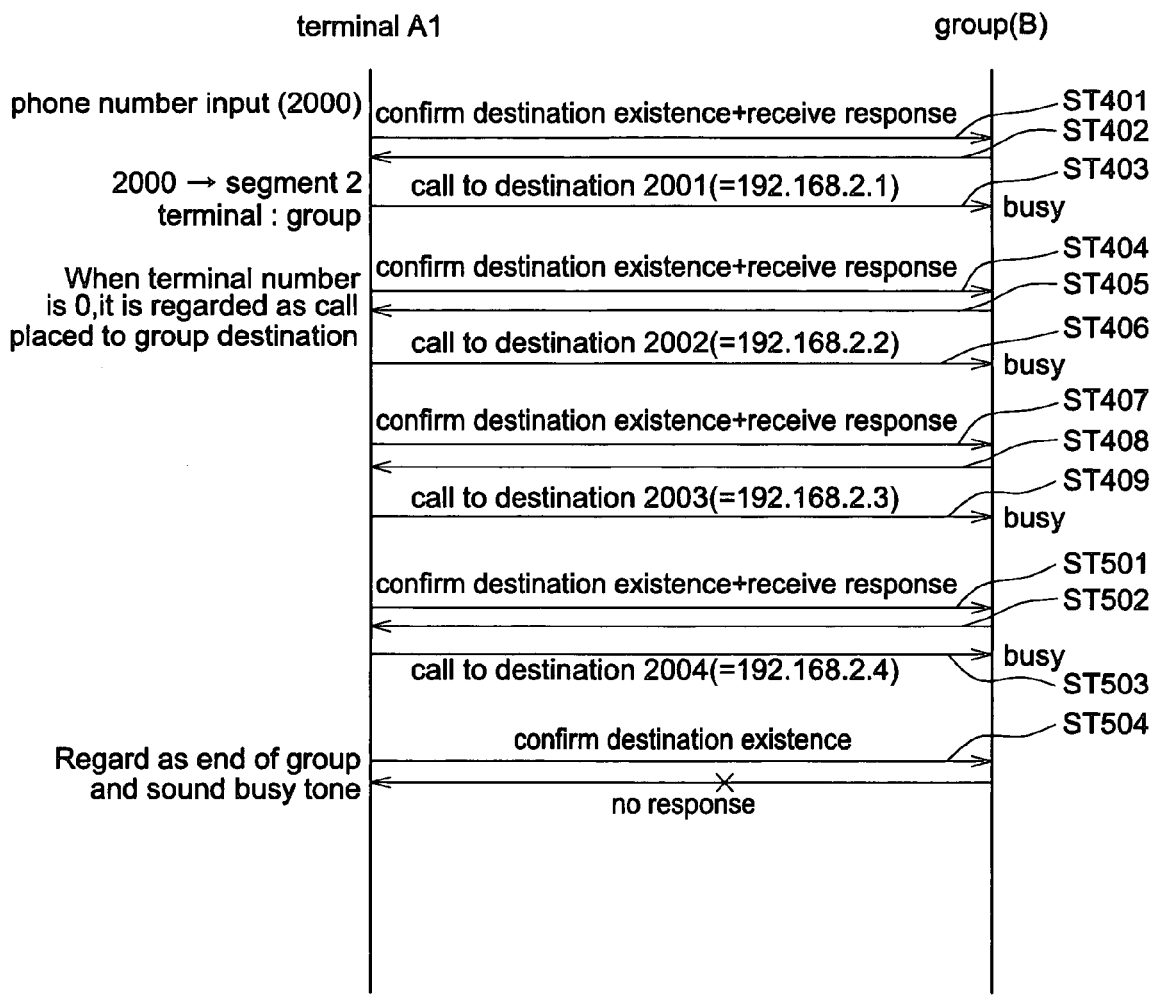
FIG. 5 is a sequence chart illustrating an operation of the Internet telephone according to the embodiment of the present invention.

FIGS. 3-5 are sequence charts illustrating an operation of the Internet telephone according to the present embodiment.

FIG. 3 illustrates a calling operation that specifies an Internet telephone. FIG. 4 illustrates a calling operation that does not specify an Internet telephone but specifies a group. FIG. 5 illustrates a calling operation that specifies a group, but the connection is unsuccessful. In this example, the Internet telephone in FIGS. 3-5 is an Internet telephone (terminal A1) that is connected to group A.

FIG. 3 illustrates a calling operation that specifies an Internet telephone to be called. In FIG. 3, a call is placed to terminal B2, as a specified Internet telephone (terminal).

In order to call terminal B2 as a destination from the Internet telephone, the operator inputs telephone number "2002" from the Internet telephone.

Upon receiving the input of the telephone number, the Internet telephone divides the number into segment number "2" and terminal number "002". Then, the Internet telephone generates an IP address of terminal B2 (192. 168. 2. 2) by using the network address for the first and second octets, and the above segment number and terminal number for the third and fourth octets, respectively.

Upon generating the IP address of terminal B2, the Internet telephone checks whether the destination of the IP address exists (hereafter referred to as "destination existence confirmation") (ST 301). In particular, the Internet telephone confirms the destination existence by transmitting, to the IP address, a Ping (Packet Internet Grouper), which executes an Echo command according to the ICMP (Internet Control Message Protocol).

When terminal B2 exists on the network, terminal B2 transmits a notification by responding to the destination existence confirmation (hereafter referred to as "existence notification") (ST 302). Specifically, terminal B2 transmits the existence notification, to the Internet telephone confirming the destination existence, by responding to the Ping.

Upon receiving the existence notification, the Internet telephone places a call to the generated IP address of terminal B2 (ST 303). When the connection to terminal B2 is successful, a talk process is performed. When the connection is unsuccessful due to a unavailable signal or the like, a unavailable process is performed.

By referring to FIG. 4, the following illustrates a situation where a call is placed to a predetermined group, instead of specifying an Internet telephone. FIG. 4 illustrates a situation where a call is placed to the specified group (B).

In order to call group (B) as a destination from the Internet telephone, the operator inputs telephone number "2000" from the Internet telephone.

Upon receiving the input of telephone number "2000", the Internet telephone divides the number into segment number "2" and terminal number "000". At this time, the Internet telephone recognizes that the call is placed to a group indicated by the segment number. Then, the Internet telephone generates an IP address of a terminal that is connected to group (B) by using the network address for the first and second octets, and the above segment number and the terminal number within the group for the third and fourth octets, respectively.

First, the IP address of terminal B1 (192. 168. 2. 1) is generated. Upon generating the IP address of terminal B1, the Internet telephone confirms the destination existence by transmitting a Ping to the IP address (ST 401), and receives a response with the Ping from terminal B1 (ST 402). Then, a call is placed to the IP address (ST 403). In this example, terminal B1 is unavailable. Herein, the term "available" includes, as example only, busy, no answer, and out of order, etc.

When terminal B1 is unavailable, the Internet telephone generates the IP address of terminal B2 (192. 168. 2. 2). Upon generating the IP address of terminal B2, the Internet telephone confirms destination existence by transmitting a Ping to the IP address (ST 404), and receives a response with the Ping from terminal B2 (ST 405). Then, a call is placed to the IP address (ST 406). In this example, terminal B2 is also unavailable.

Since terminal B2 is unavailable, the Internet telephone generates the IP address of terminal B3 (192. 168.2. 3). Upon generating the IP address of terminal B3, the Internet telephone confirms the destination existence by transmitting a Ping to the IP address (ST 407), and receives a response with the Ping from terminal B3 (ST 408). Then, a call is placed to the IP address (ST 409). In this example, terminal B3 is not unavailable. Therefore, the call can be placed from the Internet telephone to terminal B3.

By referring to FIG. 5, the following illustrates a situation where a call is unsuccessful even though the call is placed to a specified group. In FIG. 5, a call is placed to specified group (B). Since ST 401-409 of FIG. 5 are the same as in FIG. 4, the illustration of ST 401-409 are omitted.

In FIG. 5, a call is placed to terminal B3 at ST 409, but the call is unsuccessful because of a unavailable signal or the like. In such a situation, the Internet telephone generates the IP address of terminal B4 (192.168.2.4).

Upon generating the IP address of terminal B4, the Internet telephone confirms the destination existence by transmitting a Ping to the IP address (ST 501), and receives a response with the Ping from terminal B4 (ST 502). Then, a call is placed to the IP address (ST 503). In this example, terminal B4 is also unavailable.

Since terminal B4 is unavailable, the Internet telephone generates the IP address of terminal B5 (192.168.2.5). Upon generating the IP address of terminal B5, the Internet telephone confirms the destination existence by transmitting a Ping to the IP address (ST 504).

However, as shown in FIG. 1, terminal B5 does not exist in group (B). Therefore, no existence notification is transmitted in response to the destination existence confirmation. Then, the Internet telephone recognizes that terminal B4 is the last terminal within group (B) and sounds a unavailable tone, so that the operator knows that Internet telephone could not connect to any of the terminals in group (B).

Accordingly, prior to calling a destination terminal corresponding to the generated IP address, the Internet telephone, according to the present invention, first transmits a destination existence confirmation to the terminal and receives a response notification from the terminal.

Therefore, even in a situation where an IP address is sequentially generated by switching the terminal number (due to a unavailable terminal), the procedure of transmitting a command for the destination existence confirmation, prior to calling the destination terminal, can prevent unnecessary calling of non-existing terminals (since no call is placed to a terminal without a response notification).

Especially where there are a plurality of terminals within one group, all terminals are called by sequentially generating an IP address. When no response notification is received, the Internet telephone recognizes that the destination terminal called right before is the last terminal in the group. Therefore, even when there are a plurality of terminals within the group, it is possible to prevent unnecessary calling of non-existing terminals in the group.

Since the Internet telephone of the invention uses a Ping of the ICMP to confirm the destination existence prior to calling the destination terminal, thereby not requiring a complicated control in order to check the existence of the destination. However, the method of confirming the destination existence is not limited to the Ping of the ICMP. Other special commands (e.g., a command using an SNMP protocol) can be generated upon an agreement between the Internet telephones according to the present invention, and be used for obtaining a status of each terminal.

Figure 6:
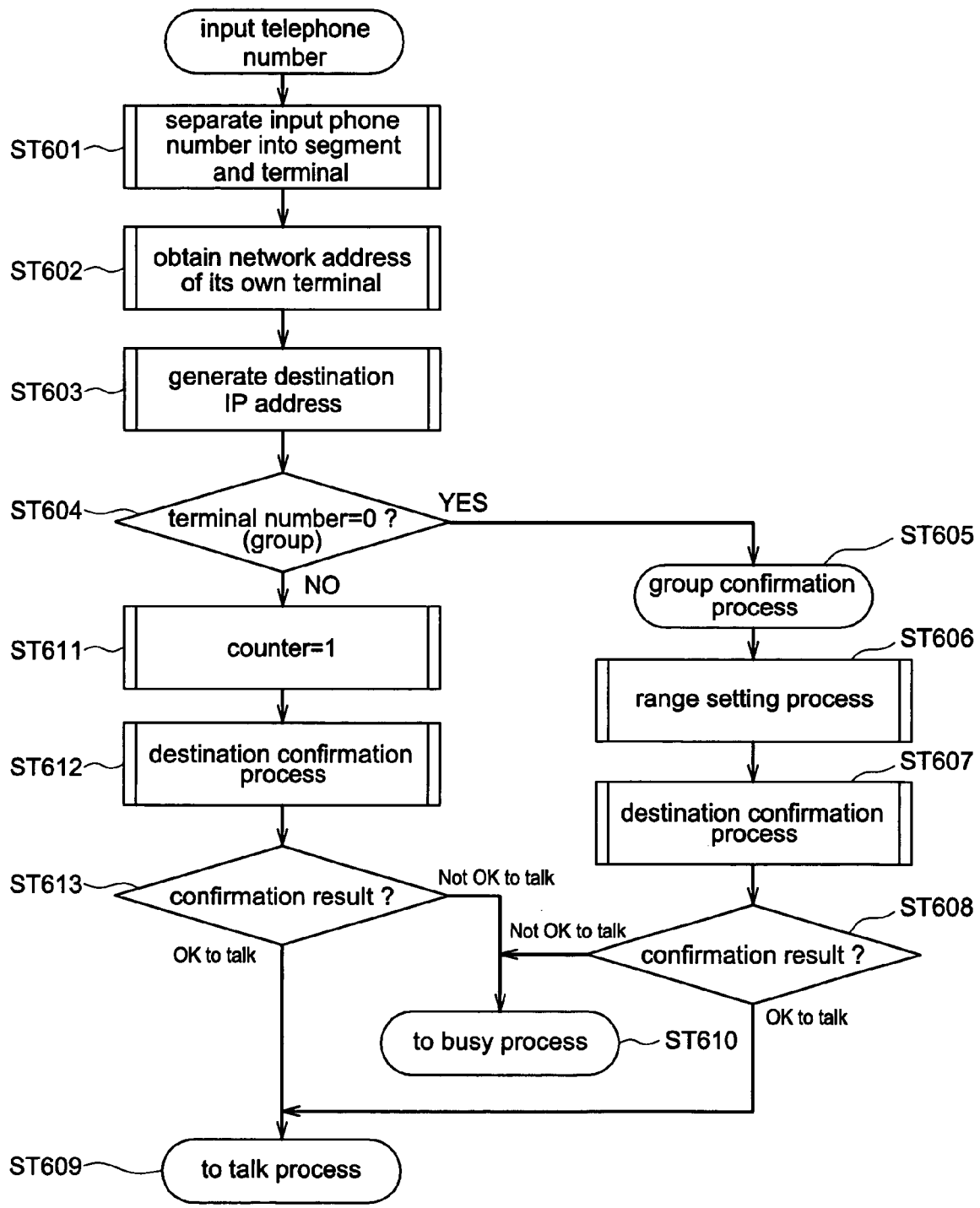
FIG. 6 is a flowchart illustrating the entire operation of the Internet telephone according to the embodiment of the present invention.

The following illustrates an actual operation of the Internet telephone for executing the above-described sequence. FIG. 6 is a flowchart illustrating the entire operation of the Internet telephone according to the present invention.

The following illustration pertains to both calling a predetermined destination terminal or calling a specified group. First, the Internet telephone receives a telephone number input by the operator. Upon receiving the telephone number input, the Internet telephone divides the number into a segment number and a terminal number (ST 601).

For example, when telephone number "2002" is input, the Internet telephone number divides the number into segment number "2" and terminal number "002". When telephone number "2000" is input, the Internet telephone number divides the number into segment number "2" and terminal number "000".

After dividing the telephone number, the network address of its own terminal is obtained (ST 602). To be specific, the network address registered in RAM 206 is retrieved and obtained. In this example, network address of terminal A1 "192. 168. 0. 0" is obtained.

Then, by combining the divided segment number and terminal number (at ST 601) with the obtained network address (at ST 602), a destination IP address is generated (ST 603).

For example, when telephone number "2002" is input, the network address "192. 168. 0. 0", segment number "2", and terminal number "002" are combined to generate an IP address "192. 168. 2. 2". When telephone number "2000" is input, the network address "192. 168. 0. 0", segment number "2", and terminal number "000" are combined to generate an IP address "192. 168. 2. 0".

When the destination IP address is generated, the Internet telephone checks whether the terminal number is "000" (ST 604). As described above, in the network to which the Internet telephones according to the present invention are connected, the selection of terminal number "000" enables a specification of a group for the call (hereafter referred to as "group call"). In other words, by checking whether the terminal number is "000" at ST 604, it is determined whether the call is a group call. For example, when the above telephone number "2000" is input, it is determined that the call is placed for the group call.

When the terminal number is "000", the Internet telephone performs a group confirmation process (ST 605). In this group confirmation process, a range of IP addresses to be called for the group call (hereafter referred to as "range setting process"), and a number of terminals in the specified group are set (ST 606). The range setting process is further described later.

After performing the range setting process, the Internet telephone performs a destination confirmation process (ST 607). In this destination confirmation process, the destination terminal of the generated IP address is checked based on the input telephone number, and a call is placed to the IP address. The destination confirmation process is further described later.

After the destination confirmation process, the Internet telephone checks the result of the destination confirmation process (ST 608). In particular, it is determined whether the result is "OK to talk" or "not OK to talk". When the confirmation result is "OK to talk", the control proceeds to a talk process (ST 609). When the result is "not OK to talk", the control proceeds to a unavailable process (ST 610).

When the terminal number is not "000" at ST 604 (e.g., when the telephone number "2002" is input as described above), the Internet telephone sets the counter for the number of to-be-called terminals (hereafter referred to as "terminal counter") to "1" (ST 611). Then, the above-described destination confirmation process is performed (ST 612). The terminal counter is assigned to a predetermined region of RAM 206.

Upon performing the destination confirmation process at ST 612, the Internet telephone checks the result of the destination confirmation process (ST 613). In particular, it is determined whether the result is "OK to talk" or "not OK to talk". When the confirmation result is "OK to talk", the control proceeds to the talk process (ST 609). When the result is "not OK to talk", the control proceeds to the unavailable process (ST 610).

Figure 7:
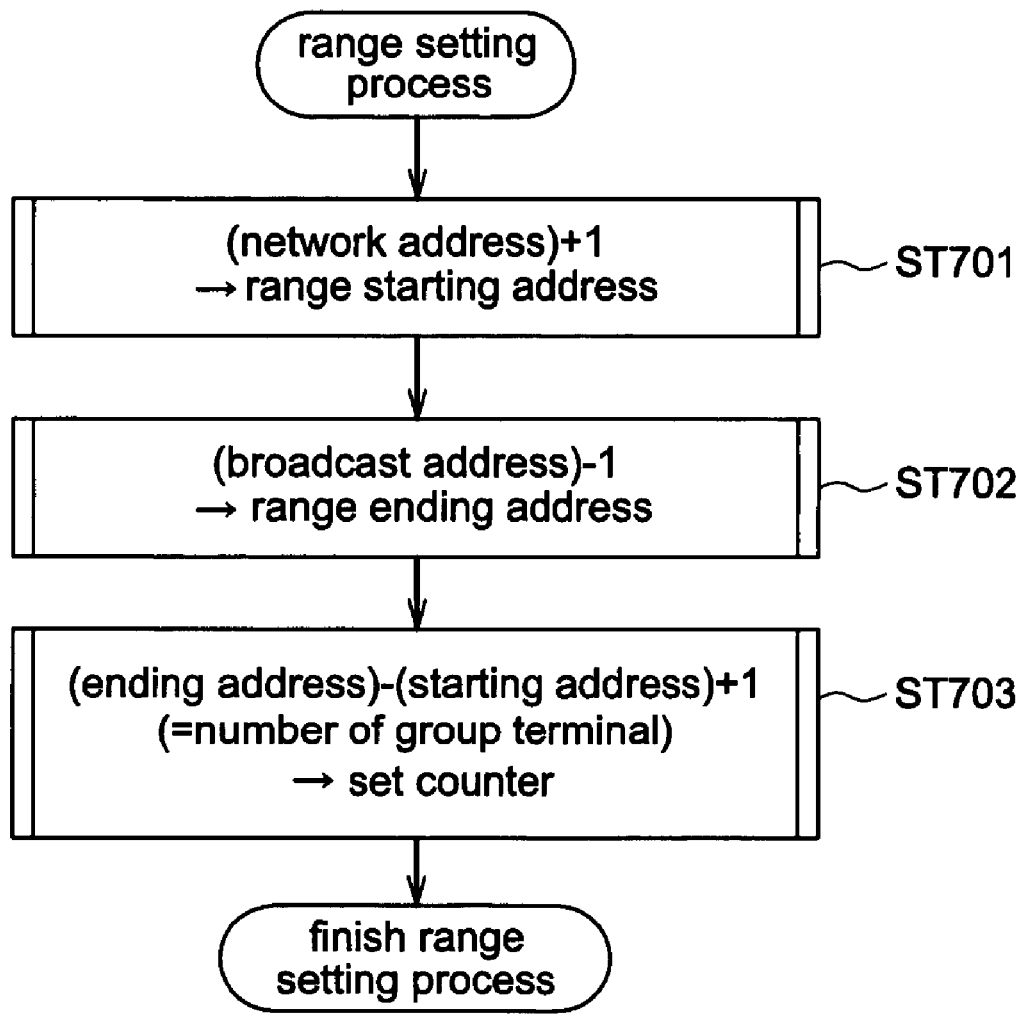
FIG. 7 is a flowchart illustrating an operation of a range setting process of the Internet telephone according to the embodiment of the present invention.

FIG. 7 is a flowchart illustrating the above-mentioned range setting process.

In order to start the range setting process, the Internet telephone first generates an IP address by using the network address obtained at ST 602, applying the segment number in the third octet, and setting "1" for the fourth octet. Thus, the IP address having the lowest number (hereafter referred to as "range starting address") is obtained (ST 701).

Using the above example of inputting telephone number "2000", the segment number "2" is applied to the third octet of the network address "192. 168. 0. 0" (obtained at ST 602). Therefore, the network address "192. 168. 2. 0" is obtained. Further, "1" is added to the network address to obtain an IP address "192. 168. 2. 1" as a range starting address.

Next, an IP address is calculated by subtracting "1" from a broadcast address, which is recognized and obtained from the network address at ST 701. Thus, the IP address having the highest number (hereafter referred to as "range ending address") is obtained (ST 702).

Using the above example of inputting telephone number "2000" and the broadcast address "192. 168. 2. 255" of the network address "192. 168. 2. 0" (obtained at ST 701), "1" is subtracted from the broadcast address to obtain an IP address "192. 168. 2. 254" as a range ending address.

Further, by subtracting the range starting address from the range ending address, and adding "1", a number of Internet telephones (terminals) within the group (hereafter referred to as "group terminal number") is obtained. This group terminal number is set in the above-described terminal counter (ST 703). The range starting address and range ending address are stored in a predetermined region of RAM 206.

Using the above example of inputting telephone number "2000", the range starting address "192. 168. 2. 1" (obtained at ST 701) is subtracted from the range ending address "192. 168. 2. 254" (obtained at ST 702) to obtain numeric value "253". Then, "1" is added to the "253" to obtain numeric value "254", which is set in the terminal counter.

When the terminal counter (for group terminal number) is set, the Internet telephone completes the range setting process.

Figure 8:
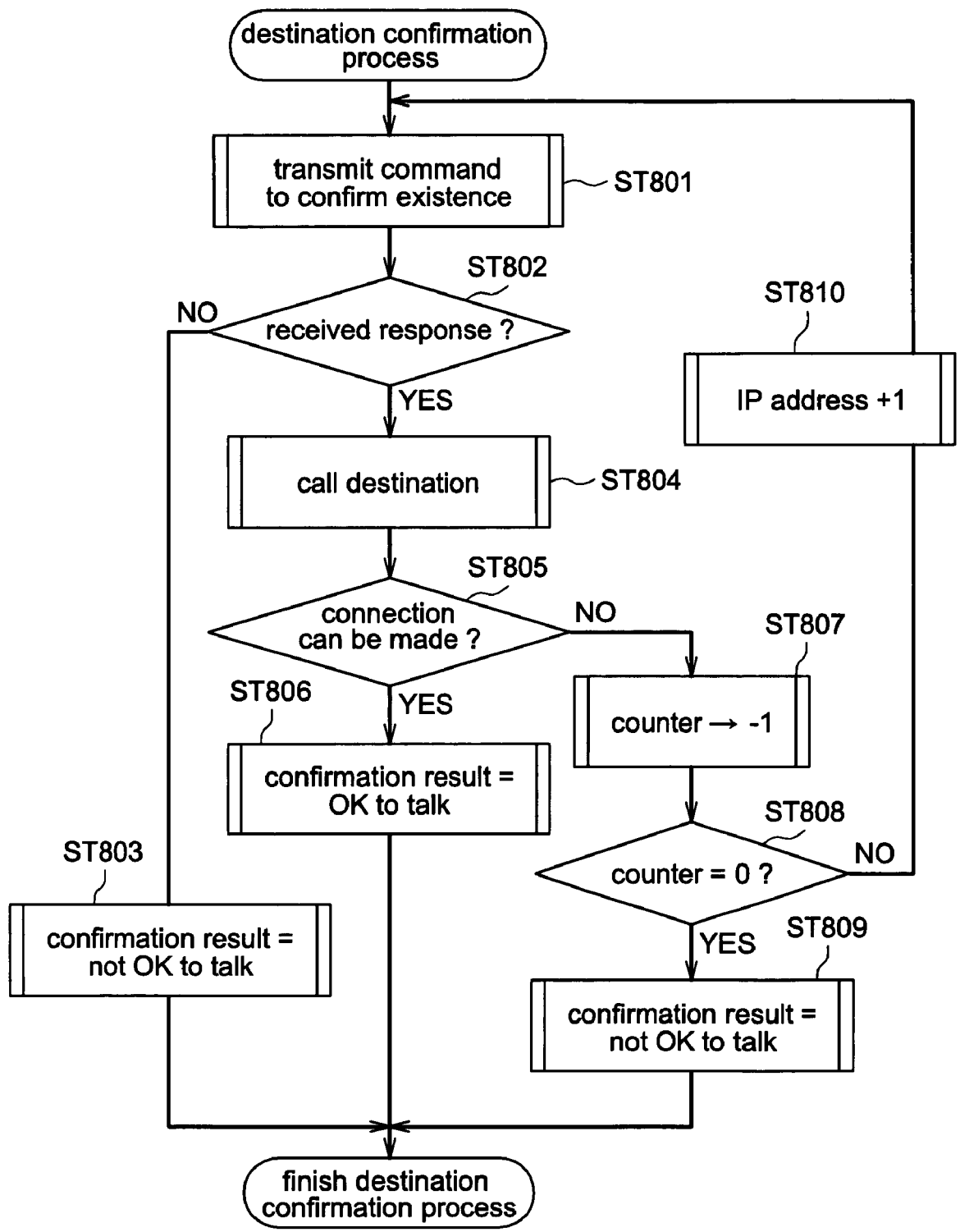
FIG. 8 is a flowchart illustrating an operation of an address confirmation process of the Internet telephone according to the embodiment of the present invention.

FIG. 8 is a flowchart illustrating the above-mentioned destination confirmation process.

In order to start the destination confirmation process, the Internet telephone transmits the above-mentioned command for the destination existence confirmation to the generated IP address (ST 801). Then, it is determined whether there is a response from the destination terminal of the IP address (ST 802).

For example, when telephone number "2002" is input, the command for the destination existence confirmation is transmitted to the generated IP address "192. 168. 2. 2" as described above. When telephone number "2000" is input, the command for the destination existence confirmation is transmitted to the range starting address "192. 168. 2. 1", which is generated by the range setting process.

When there is no response from the destination terminal of the IP address even after transmitting the command for the destination existence confirmation, the Internet telephone sets "not OK to talk" as the result of the destination confirmation process (ST 803) and completes the destination confirmation process. The result of the destination confirmation process is registered in a predetermined region of RAM 206.

When there is a response from the destination terminal of the IP address, the Internet telephone places a call to the IP address (ST 804) and checks whether the connection to the destination terminal of the IP address is available (ST 805). In this embodiment, factors such as a unavailable signal at the destination terminal is checked for the connection.

When it is determined that the connection to the destination terminal is successful, the Internet telephone sets "OK to talk" as the result of the destination confirmation process (ST 806) and completes the destination confirmation process. When it is determined that the connection to the destination terminal is not successful, the Internet telephone decrements the set value at the above terminal counter by "1" (ST 807).

Then, it is determined whether the terminal counter value after the decrement process is "0" (ST 808). When the terminal counter value is "0", the Internet telephone sets "not OK to talk" as the result of the destination confirmation process (ST 809), and completes the destination confirmation process.

For example, when telephone number "2002" is input, the terminal counter is set to "1" as described above. Therefore, at ST 807, the terminal counter value is set to "0", and at ST808 it is determined that the terminal counter value is "0". Conversely, when telephone number "2000" is input, the terminal counter is set to "254". Therefore, at ST 807, the terminal counter value is set to "253", and at ST808 it is determined that the terminal counter value is not "0".

When the terminal counter value is not "0" after the decrement process, the Internet telephone increments the value of the currently called IP address by "1" (ST 810), and the control returns to ST 801. Then, the same process is repeated for incremented the IP address.

For example, when telephone number "2000" is input and the currently called IP address has the range starting address of "192. 168. 2. 1", "1" is added to the numeric value of the IP address. Then, the same process from ST 801-ST 810 is performed for the obtained IP address "192. 168. 2. 2". After repeating the above-described process, e.g., when the value exceeds the IP address of terminal B4 of group (B), the response cannot be received at ST 802. In this case, the Internet telephone sets "not OK to talk" as the result of the destination confirmation process and completes the destination confirmation process.

According to the Internet telephone of the present invention, the network address of its own Internet telephone is registered in RAM 206. Therefore, the registered network address and an input telephone number (extension number) of a destination terminal within the same network are combined together to generate an IP address, which is used to place a call to the destination terminal of the telephone number.

By using the extension number of the destination terminal for a host address (third and fourth octets) of the destination terminal's IP address, an IP address can be generated simply by adding the input telephone number to the network address of the Internet telephone. Therefore, when specifying a terminal destination within its own network, the IP address of the destination terminal can be discovered without the help of a server, thereby eliminating the need of a server for the Internet telephone calls.

To be specific, the Internet telephone according to the present invention registers, in RAM 206, the first numeric character string (first and second octets) of its own network. When there is an input of a telephone number of the destination terminal, the first region of the telephone number (first digit) is recognized as the second numeric string (third octet) that indicates a group within the network. Then, the second region of the telephone number (second to last digits) is recognized as the third numeric string (fourth octet) that indicates each terminal. By combining the second and third numeric strings with the first numeric string registered in RAM 206, an IP address is generated. Further, based on the IP address, a call is placed to the destination terminal corresponding to the telephone number.

Accordingly, since a terminal number of the destination terminal is used for a part of the IP address of the destination terminal (at fourth octet), an IP address can be easily generated by applying the terminal number to the IP address of its own network address as described above. Therefore, when specifying a terminal destination within its own network, the IP address of the destination terminal can be discovered without the help of a server, thereby eliminating the need of a server for the Internet telephone calls.

In addition, since a numeric string indicating the group within its own network is used for a part of the IP address of the destination terminal (at third octet), an IP address can be easily generated by applying the second numeric string (indicating the group number) to the IP address of its own network address, even though there are plurality of groups within the network. Therefore, when specifying a terminal destination within its own network, the IP address of the destination terminal can be discovered without the help of a server, thereby eliminating the need of a server for the Internet telephone calls.

Further, according to the Internet telephone of the present invention, when a telephone number of a destination terminal within the same network is input, it is checked whether the telephone number has a predetermined number (terminal number "000"). When it is the predetermined number, the telephone number is converted into an initial value. By combining the network address registered in RAM 206 and the initial value, an IP address is generated and a call is placed to the corresponding destination terminal of the IP address. When the destination terminal is unavailable, the initial value is incremented. By combining the incremented value and the network address registered in RAM 206, another IP address is generated and a call is placed to the corresponding destination terminal of the IP address.

Accordingly, when the input number has the predetermined number, it is determined that the call is placed not to a predetermined destination terminal, but the entire network to which a plurality of terminals belong. Since each IP address is generated by sequentially inputting a different number, another terminal within the group can be accessed even when one terminal within the same group is unavailable. Therefore, it is possible to eliminate the bother of terminating the call and redialing an extension of another terminal, when one terminal within the group is unavailable, thereby largely reducing the steps of a call operation.

The embodiment of the Internet telephone according to the present invention illustrates a situation, where a group call is selected and a call placed to the destination terminal of the range starting address is unsuccessful, the IP address is incremented to place another call. When a predetermined terminal is selected and the call is not successful, the call is terminated. However, the present invention is not limited to the above method. In other words, when a call to a predetermined terminal is selected and a call placed to the destination terminal is unsuccessful, the IP address of the destination terminal can be automatically incremented to place another call to the incremented IP address.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2003-088584 filed on Mar. 27, 2003, entire content of which is expressly incorporated by reference herein.

What is claimed is:

1. An Internet telephone apparatus, comprising:
   a key pad configured to input an extension number of a call destination, a plurality of telephone apparatuses being associated with the call destination;
   a memory configured to store a first octet and a second octet of an IP address of a network to which the Internet telephone apparatus is connected; and
   a controller configured to set a part of the extension number as a third octet of the IP address, to set another part of the extension number as a fourth octet of the IP address, to generate an IP address based on a combination of the first octet and the second octet of the IP address stored in the memory together with the set third octet and the set fourth octet of the IP address, and to access a network telephone apparatus of the call destination over the Internet based on the IP address.

2. The Internet telephone apparatus according claim 1, wherein the part of the extension number set as the third octet of the IP address is the first digit of the extension number, and the another part of the extension number set as the fourth octet of the IP address is the second digit to the last digit of the extension number.

3. An Internet telephone apparatus, comprising:
- a key pad configured to input an extension number of a call destination, a plurality of telephone apparatuses being associated with the call destination;
- a memory configured to store a network address of a network to which the Internet telephone apparatus is connected;
- a controller configured to determine whether an input extension number is a predefined number, to replace the input extension number with a predetermined number when the extension number is the predefined number, to set the predetermined number as a first host address, to generate an first IP address based on a combination of the network address stored in the memory and the first host address, and to access a network telephone apparatus of the call destination over the Internet based on the first IP address, the network telephone apparatus of the call destination being associated with the input extension number; and
- the controller, when the network telephone apparatus of the call destination is unavailable, increments the predetermined number, sets the incremented number as a second host address, generates a second IP address based on a combination of the network address stored in the memory and the second host address, and accesses another network telephone apparatus of the call destination over the Internet based on the second IP address without a user intervention at the Internet telephone apparatus.

4. The Internet telephone apparatus according to claim 3, wherein the controller transmits a confirmation signal to the call destination for confirming that a network telephone apparatus corresponding to one of the first IP address and the second IP address exists, and accesses the network telephone apparatus based on one of the first IP address and the second IP address when a response to the confirmation signal is received.

5. The Internet telephone apparatus according to claim 4, wherein the confirmation signal is an ICMP ping signal.

6. An Internet telephone apparatus, comprising:
- a key configured to input an extension number of a call destination, a plurality of telephone apparatuses being associated with the call destination;
- a memory configured to store a network address of a network to which the Internet telephone apparatus is connected;
- a controller configured to separate an input extension number into a first part and a second part, to determine whether the second part of the extension number is a predefined number, to replace the second part with a predetermined number when the second part number is the predefined number, to generate a first IP address based on a combination of the network address stored in the memory, the first part of the extension number, and the predetermined number, and to access a network telephone apparatus of the call destination over the Internet based on the first IP address, the network telephone apparatus of the call destination being associated with the input extension number; and
- the controller, when the network telephone apparatus of the call destination is unavailable, increments the predetermined number, generates an second IP address based on a combination of the network address stored in the memory, the first part of the extension number, and the incremented number, and accesses another network telephone apparatus of the call destination over the Internet based on the second IP address without user intervention at the Internet telephone apparatus.

7. The Internet telephone apparatus according claim 6, wherein the first part of the extension number is the first digit of the extension number, and the second part of the extension number is the second digit to the last digit of the extension number.

8. The Internet telephone apparatus according to claim 6, wherein the controller transmits a confirmation signal to the call destination for confirming that a network telephone apparatus corresponding to one of the first IP address and the second IP address exists, and accesses the network telephone apparatus based on one of the first IP address and the second IP address when a response to the confirmation signal is received.

9. The Internet telephone apparatus according to claim 8, wherein the confirmation signal is an ICMP ping signal.

10. A method of communicating over the Internet utilizing an Internet telephone apparatus connected to a network in which the common network address of an IP address is utilized for a plurality of Internet telephone apparatuses, a memory storing the common network address, an extension number of each telephone apparatus in the network corresponding to a host address of an IP address, the communicating comprising:
- inputting an extension number of a network destination telephone apparatus;
- setting an extension number as a host address of the IP address when the extension number is input;
- generating an IP address based on a combination of the network address stored in the memory and the set host address; and
- accessing the network destination telephone apparatus over the Internet based on the IP address.

11. A method of communicating utilizing over the Internet utilizing an Internet telephone apparatus connected to a network, in which a first octet and a second octet of an IP address is commonly utilized for a plurality of Internet telephone apparatuses, a memory storing the first octet and the second octet of the IP address, a part of an extension number of each telephone apparatus on the network corresponding to a third octet of the IP address and another part of the extension number of the telephone apparatus corresponding to a fourth octet of the IP address, the communicating method comprising:
- inputting an extension number of a network destination telephone apparatus;
- setting a part of the extension number as the third octet of the IP address and another part of the extension number as the fourth octet of the IP address when the extension number is input;
- generating an IP address based on a combination of the first octet and the second octet of the IP address stored in the memory together with the set third octet and the set fourth octet of the IP address; and
- accessing the network destination telephone apparatus over the Internet based on the IP address.

* * * * *